United States Patent [19]

Lee

[11] Patent Number: 5,353,120
[45] Date of Patent: Oct. 4, 1994

[54] VIDEO FIELD MEMORY DEVICE FOR MULTI-BROADCASTING SYSTEM AND MANUFACTURING METHOD THEREFOR

[75] Inventor: Jang K. Lee, Seoul, Rep. of Korea

[73] Assignee: Samsung Electronics Co., Ltd., Suweon, Rep. of Korea

[21] Appl. No.: 891,791

[22] Filed: Jun. 1, 1992

[30] Foreign Application Priority Data

Oct. 17, 1991 [KR] Rep. of Korea .................... 91-18334

[51] Int. Cl.⁵ ............................................. H04N 5/951
[52] U.S. Cl. .................................... 348/555; 348/718; 348/729; 365/230.03; 345/189
[58] Field of Search ..................... 350/149, 160, 21 R, 350/13 C; 340/799; 365/230.03, 230.04, 236, 49; 345/189, 190; H04N 5/907

[56] References Cited

U.S. PATENT DOCUMENTS

| 4,439,762 | 3/1984 | Van Vliet et al. | 340/799 |
| 4,849,937 | 7/1989 | Yoshimoto | 365/230.04 |
| 5,117,395 | 5/1992 | Hashimoto | 365/230.03 |
| 5,210,717 | 5/1993 | Tamaki | 365/230.03 |

FOREIGN PATENT DOCUMENTS

0249574 10/1987 Japan .................... H04N 5/907

Primary Examiner—Mark R. Powell
Assistant Examiner—Jeffrey S. Murrell
Attorney, Agent, or Firm—Ladas & Parry

[57] ABSTRACT

A video field memory device for multi-broadcasting system employs upper and lower half memory cell arrays for storing a video signal according to the largest scanning bit and the largest scanning line of the multi-broadcasting system, and the upper and lower half memory cell arrays having the scanning bits of 1023×4 and the scanning lines of 313×4 corresponding to the largest one of various television broadcasting systems. Thus, the video field memory device for multi-broadcasting system for varying the scanning bits or the scanning lines can select a broadcasting system in a single chip by using a external TYPE signal, independent of the scanning bits or the scanning lines for each television broadcasting system.

12 Claims, 8 Drawing Sheets

VIDEO FIELD MEMORY DEVICE FOR MULTI-BROADCASTING SYSTEM AND MANUFACTURING METHOD THEREFOR

BACKGROUND OF THE INVENTION

The present invention relates to a field memory device which is essential to enhanced density televisions (ED-TV) and high definition televisions (HD-TV) and, more particularly, to a video field memory device for multiple TV broadcasting systems for varying a desired scanning bit or a desired scanning line inside a single chip by using external signals for selecting one of TV broadcasting systems independent of the scanning bit or the scanning line which is different according to each television broadcasting system, and a processing method therefor.

In a conventional video field memory and frame memory for processing a digitalized video signal, there is a restriction that the memory devices must be selected differently depending on the television broadcasting system. The NTSC system and the PAL system have different scanning bits and lines.

Also, in the digital selection broadcasting system to be generalized at the next generation, the video field memory temporarily stores a constant image scene provided through a tuner and converts it to a digital signal. Thus, the video field memory has to input or output a video data signal at a high speed by a special function, and the structure and the density of video memory cells are different from each other because the video field memory is used for a video display.

Figure 1A:
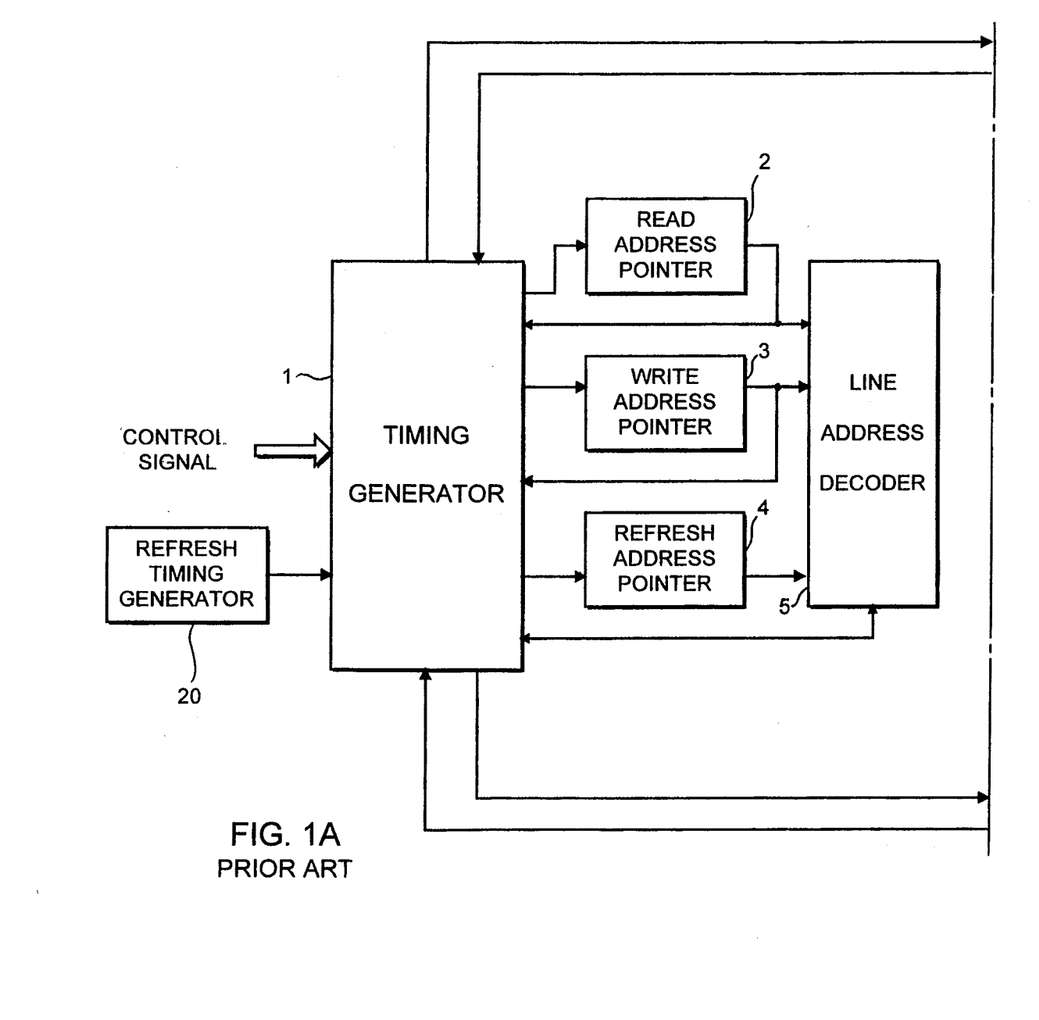
FIGS. 1A and 1B are block diagrams showing a conventional video field memory device.
Figure 1B:
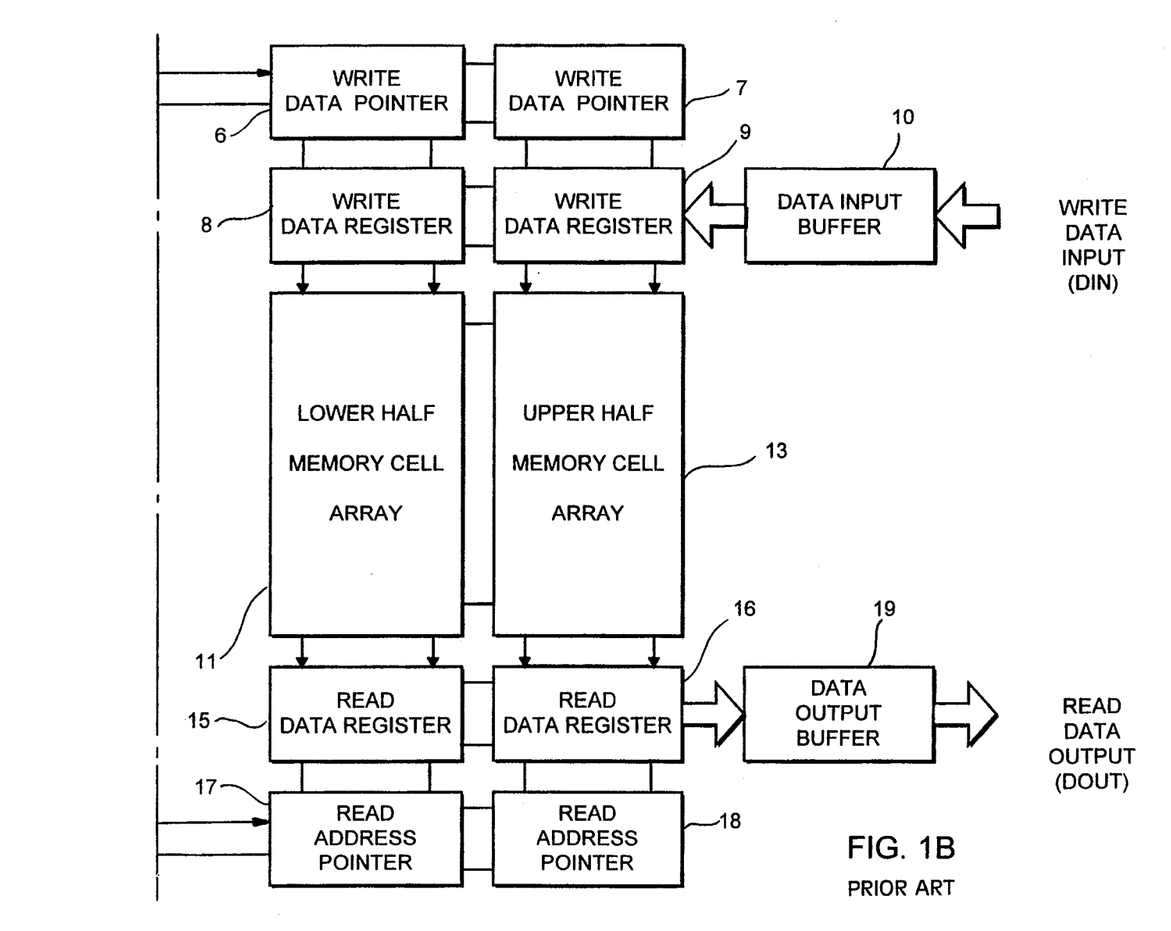

FIG. 1 shows a block diagram of the conventional video field memory device, comprising upper and lower half memory cell arrays 11 and 13 corresponding to the scanning bit and the scanning line of the NTSC and PAL systems, write data registers 8 and 9 for writing serial input data in parallel through a data input buffer 10 at a line of the upper and lower memory cells, data write pointers 6 and 7 for assigning write bit points to the write data registers 8 and 9, data read registers 15 and 16 for reading the output parallel data in serial at a line of the upper and lower half memory cell arrays 11 and 13, data read pointers 17 and 18 for assigning read bit points to the data read registers 15 and 16, a line address decoder 5 for decoding the read and write address lines of the upper and lower half memory cell arrays 11 and 13 according to the sequences of the address pointers assigned among a read address pointer 2, a write address pointer 3 and a refresh address pointer 4, a timing generator 1 for controlling the timing sequence of each of the address pointers 2, 3 and 4 by being driven according to a control signal $\phi$ and a refresh signal provided from a refresh timing generator 20, and a data address output buffer 19 for providing a read data output DOUT from the data read register 16 in serial.

Also, the timing sequence and the signal from the time pointer are transmitted between the timing generator 1 and the data read registers 15 and 16.

In the conventional video field memory device, a write data input DIN is applied to the data input buffer 10 and the buffered write data is serially transmitted to the write data registers 8 and 9 respectively. Subsequently, the serially transmitted write data is transmitted in parallel and are written to the upper and lower half memory cell arrays 11 and 13 respectively according to the pointing sequences of the write data pointers 6 and 7, respectively. Next, the written data is serially provided to the data read registers 15 and 16 from the memory cell array 11 and 13 and applied to the data read output buffer 19 in parallel. Then, the read data output DOUT is provided from the read address output buffer 19 in sequence of the addresses according to the pointing sequences of the lines assigned by the address read pointers 17 and 18.

Under this condition, the timing generator 1 controls a corresponding one among the read address pointer 2, the write address pointer 3, and the refresh address pointer 4 in response to the fixed scanning bit and line of the memory cell arrays 11 and 13. Further, the address of the address pointers 2, 3, or 4 is provided to the line address decoder 5, thereby decoding the memory cell arrays 11 and 13 in unit of block.

In the conventional video field memory device, the memory cell arrays and their peripheral circuits are designed to be suitable only for a particular television system, for example, the NTSC or PAL system, so that, for the multi-broadcasting system television, they have to be changed differently.

Up to now, digital multi-broadcasting system televisions for processing the digital video signal, also, have to employ differently designed field or frame memory depending on the broadcasting system.

SUMMARY OF THE INVENTION

In order to overcome these problems. An object of the present invention is to provide a video field memory device for multi-broadcasting system which is designed to be suitable for various television broadcasting systems by comprising a video field memory in a single chip.

Another object of the present invention is to provide a method for processing the video field memory device for multi-broadcasting system comprising a simplified video signal processor and its peripheral circuits such as video output means by designing the video field or the frame memory suitably for various television broadcasting systems.

In order to achieve these objects, there is provided a video field memory device for multi-broadcasting system comprising upper and lower half memory cell arrays for storing an image memory into memory cells according to a scanning bit and a scanning line in NTSC and PAL systems, data write registers for writing serial input data in parallel which is provided through a data input buffer into a data line of the upper and lower memory cell arrays, data write pointers for assigning write bit points to the data write registers, data read registers for serially reading out the parallel output data from an address line of the upper and lower half memory cell arrays, data read pointers for assigning read bit points to the data read registers, a line address decoder for decoding read and write address lines of the upper and lower half memory cell arrays according to the address sequence pointed from among read address pointer, a write address pointer, and a refresh address pointer, an address input circuit for controlling each of the address pointers, input and output buffers, and control circuits for varying the scanning bits and lines according to the television broadcasting system to be used.

There is also provided memory cell arrays consisting of two blocks for the NTSC and PAL systems, in which a read address transferring path comprises a read address decoder for decoding read address lines according to a read block selection tag pulse and the output pulse OR of a read bit counter an 568 data read registers for storing a signal provided through read input/output lines to each of the read address lines decoded by the read address decoder, and a write address transferring path comprises a write address decoder for decoding write address lines according to a write block selection tag pulse and the output pulse W of a write bit counter and 568 write data registers for storing a signal provided through write input/output lines to each of the write address lines selected by the write address decoder.

Also, the read address decoder and the write address decoder are operated by a reset signal selected by the read and write bit counters according to the broadcasting systems, respectively.

BRIEF DESCRIPTION OF THE DRAWINGS

The present invention will be described in more detail with reference to the accompanying drawings, in which.

DETAILED DESCRIPTION OF THE PREFERRED EMBODIMENT

Now, a preferred embodiment of this invention will be described in more detail with reference to the drawings.

Figure 2A:
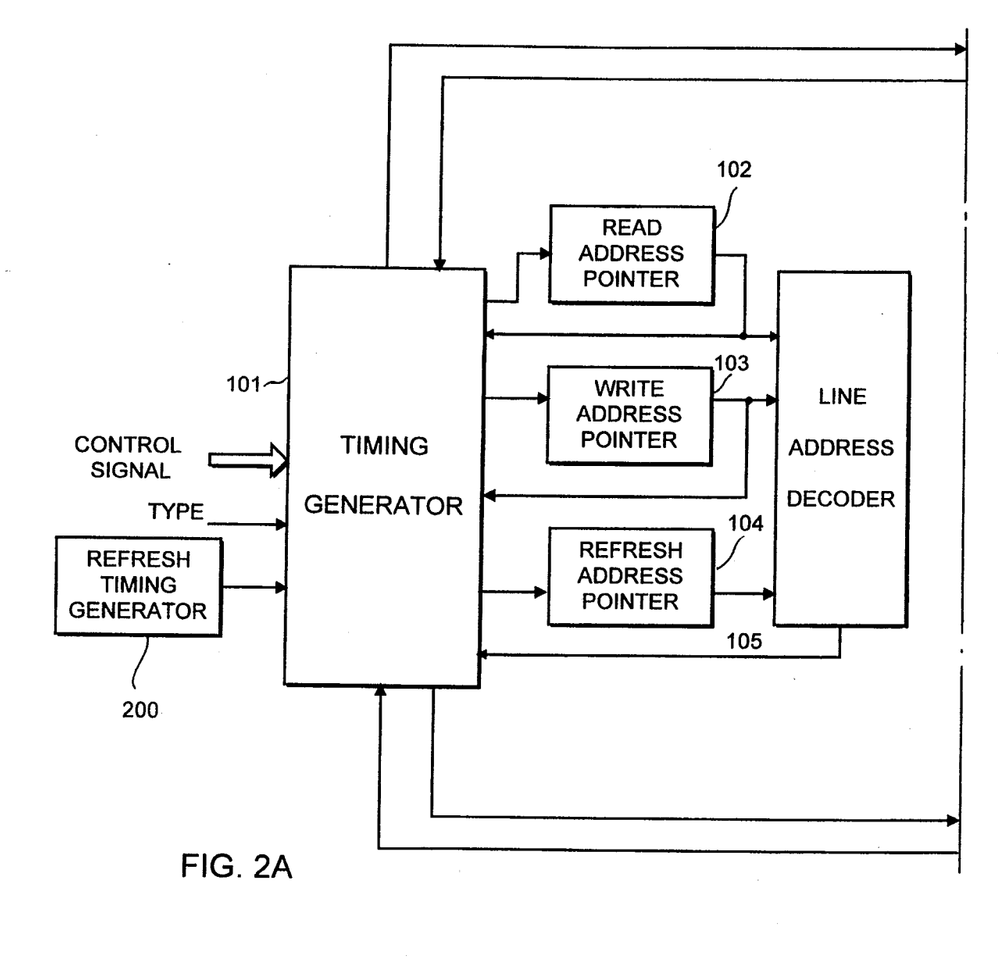
FIGS. 2A and 2B are block diagrams showing a video field memory device for multi-broadcasting system according to the present invention.
Figure 2B:
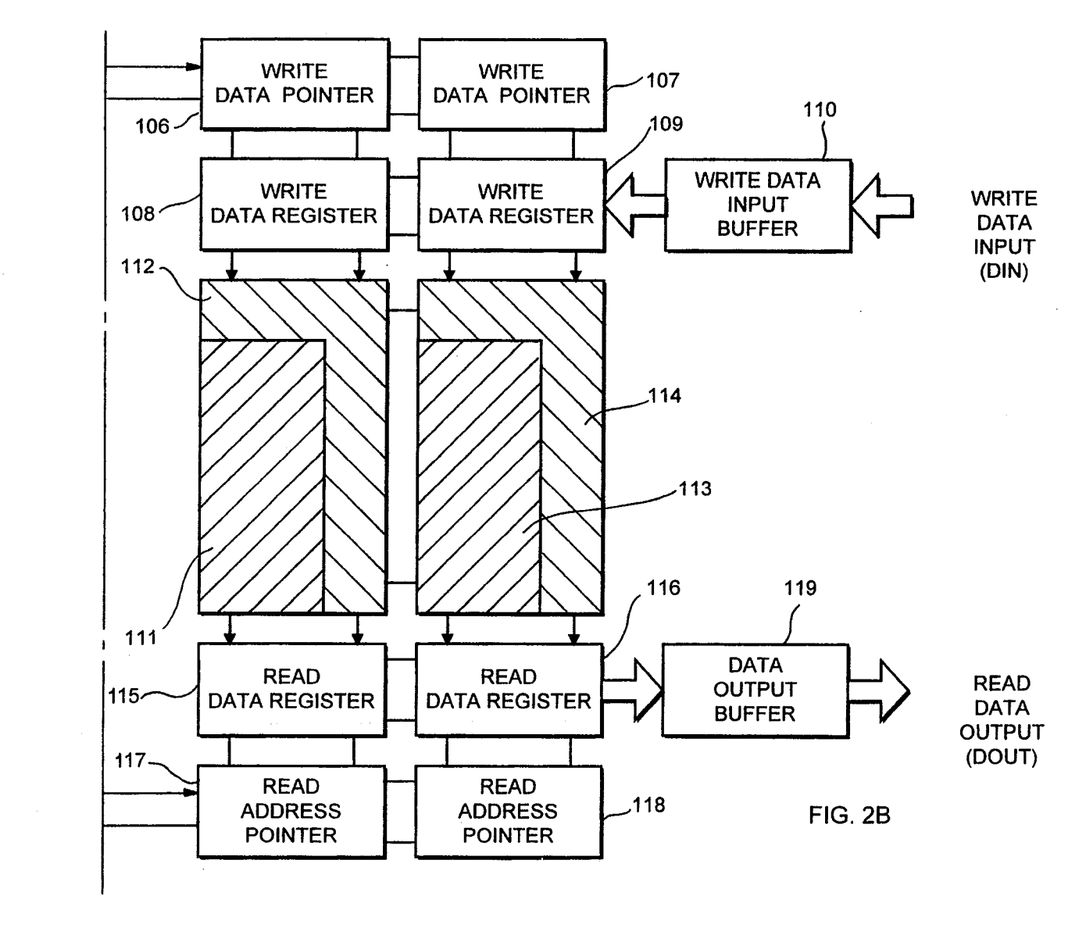

FIG. 2 is a block diagram showing a video field memory device for multi-broadcasting system according to the present invention. Lower and upper half memory cell arrays 111 and 113 are respectively composed of four 455×263 internal memory cell array blocks, and thus, the total memory cell array blocks have scanning bits of 910×4 and scanning lines of 263×4.

Finally, the total memory blocks have scanning bits of 1023×4 and scanning lines of 313×4. That is, scanning bits of 113×4 and scanning lines of 50×2×4 are added to the conventional memory blocks by further lower and upper memory cell arrays 112 and 114. Then, write data registers 108 and 109 and read data registers 115 and 116 have scanning bits of 568×4, respectively.

Also, write data pointers 106 and 107 and read address pointers 117 and 118 accomodate an internal 11-bit counter for counting 0 to 568, including the tag bit for distinguishing the lower half memory cell array block from the upper half memory cell array block.

Figure 3A:
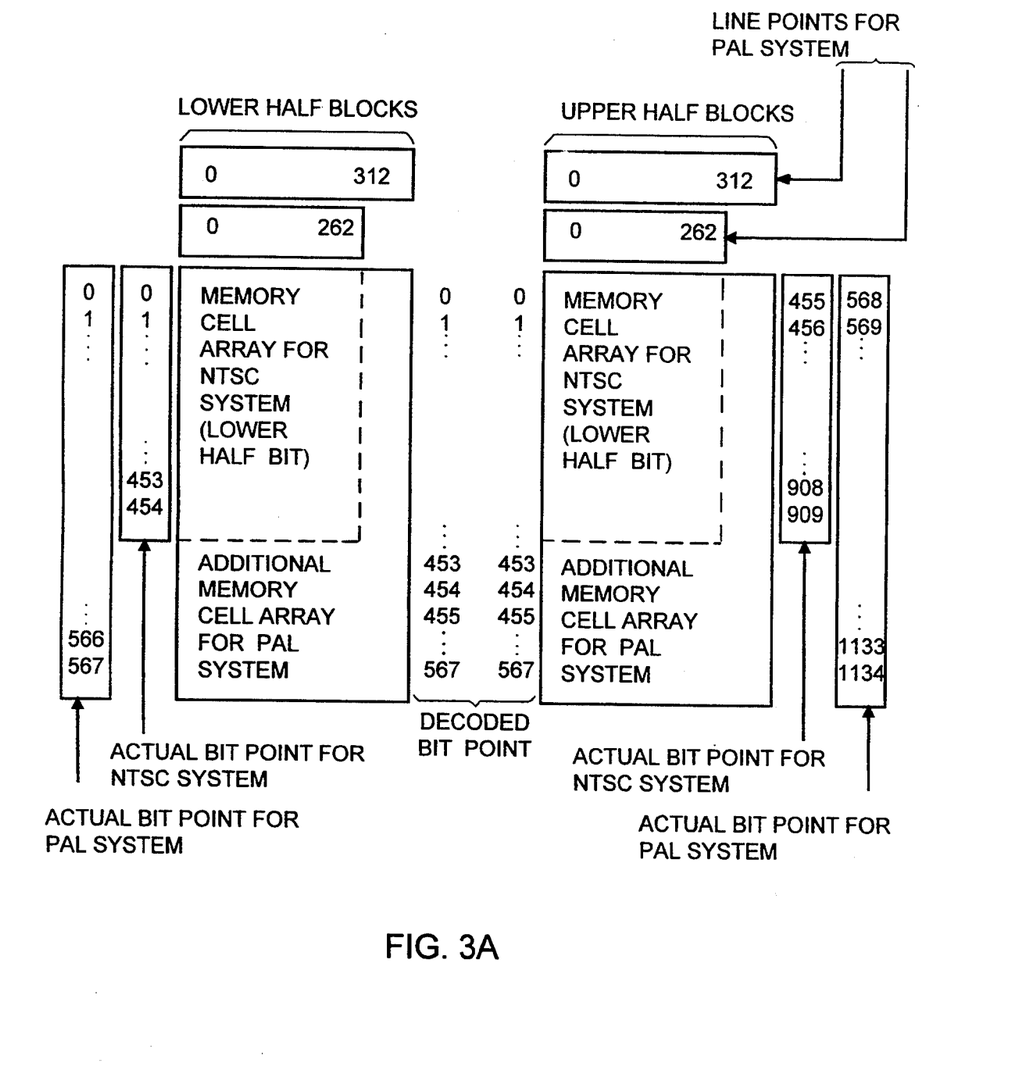
FIGS. 3A and 3B illustrate the control of substantial pointing sequences for the scanning bit and line of the multi-broadcasting system video field memory device as shown in FIG. 2.
Figure 3B:
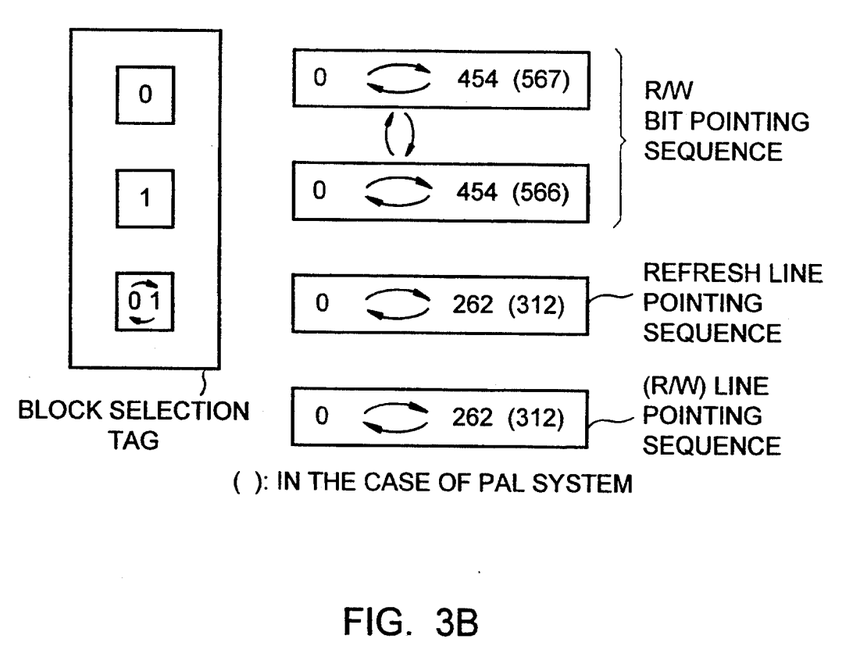

Read and write address pointers 102 and 103 and a refresh address pointer 104 are reset after counting up to the 262nd line in the NTSC system, while counting up to the 312th line in the PAL system as shown in FIG. 3B.

The read address pointer 117 and the write data pointer 106 are reset to 0 after counting up to the 454th bit in the NTSC system, or counting up to the 567th bit in the PAL system. A timing generator 101 for providing time pointer signals to the address pointers 102, 103, and 104 selects either of the NTSC and PAL systems according to an external selection signal TYPE. If the signal TYPE is a high logic signal the NTSC system is selected, while if the signal TYPE is low, the PAL system is selected.

Also, the timing generator 101 exchanges the data between write data registers and the read address pointers 108, 109, 117 and 118 and the upper and lower memory cell array blocks, or controls the address pointers and the data input/output buffers.

Each write data input buffer 110 and read data output buffer 119 include four buffers for control the write data input and the read address output.

A refresh timing generator 200 operates by itself without any external control signal and provides a refresh time for all the cells of the lower and upper memory cell arrays to the timing generator 101.

FIGS. 3A and 3B show a preferred embodiment for explaining the control of pointing sequence for the scanning bit and the scanning line according to the multi-broadcasting system video field memory device.

Referring to FIG. 3A, all of the read address pointers 117 and 118 and the write data pointers 106 and 107 of FIG. 2 have an internal 10-bit counter except the tag bit for selecting one of the upper and lower half memory cell array blocks (totally 11-bit counter). The counter is reset to 0 after counting up to 454 in the NTSC system. The tag pulse for selecting a memory cell array block is toggled each time the value of the counter becomes "0". If the tag pulse is "low", the lower half memory cell array blocks 111 and 112 are selected, while the tag pulse is "high", the upper half memory cell blocks 113 and 114 are selected.

On the other hand, in the PAL system, the counter is reset to 0 after counting up to 567 similarly to the NTSC system, if the tag pulse is "low", the lower half memory cell array blocks 111 and 112 are selected, while if the tag pulse is "high", the upper half memory cell array blocks 113 and 114 are selected. However, when the upper half memory cell blocks 113 and 114 are selected, i.e., the tag pulse is "high", the counter counts only up to 566 instead of 567.

Thus, even though the number of the total scanning bits is 910 for the NTSC system and 1135 for the PAL system, the real counting is performed in the range of 0~455 for the NTSC system and 0~568 for the PAL system, respectively.

Referring to FIG. 3B, the line address decoder 105 sequentially points 0~262 for the NTSC system and 0~312 for the PAL system by being provided with the pointing value from the read and write address pointers 102 and 103. Also, the refresh line pointing is carried out in the range of 0–525 for the NTSC system and 0–625 for the PAL system. But, a refresh counter in the refresh address pointer 103, in fact, counts only up to 262 for the NTSC system and 312 for the PAL system and is reset to 0. The tag bit is toggled each time the refresh counter becomes 0. Thus, the upper and lower memory cell array blocks are alternatively selected so that totally 525 lines for the NTSC system and 625 lines for the PAL system are really selected.

As described above, the upper and lower memory cell arrays are respectively divided into two internal blocks, so that they are controlled into the divided points to be suitable for both the NTSC and PAL systems. Also, the address pointing is to be half the corresponding range and the upper and lower memory cell array blocks are alternatively selected by the tag signals. The reset points of the counters in each pointer are variable depending on the selected broadcasting system controlled by an additional counter to be driven according to the external broadcasting selection signal TYPE.

Figure 4A:
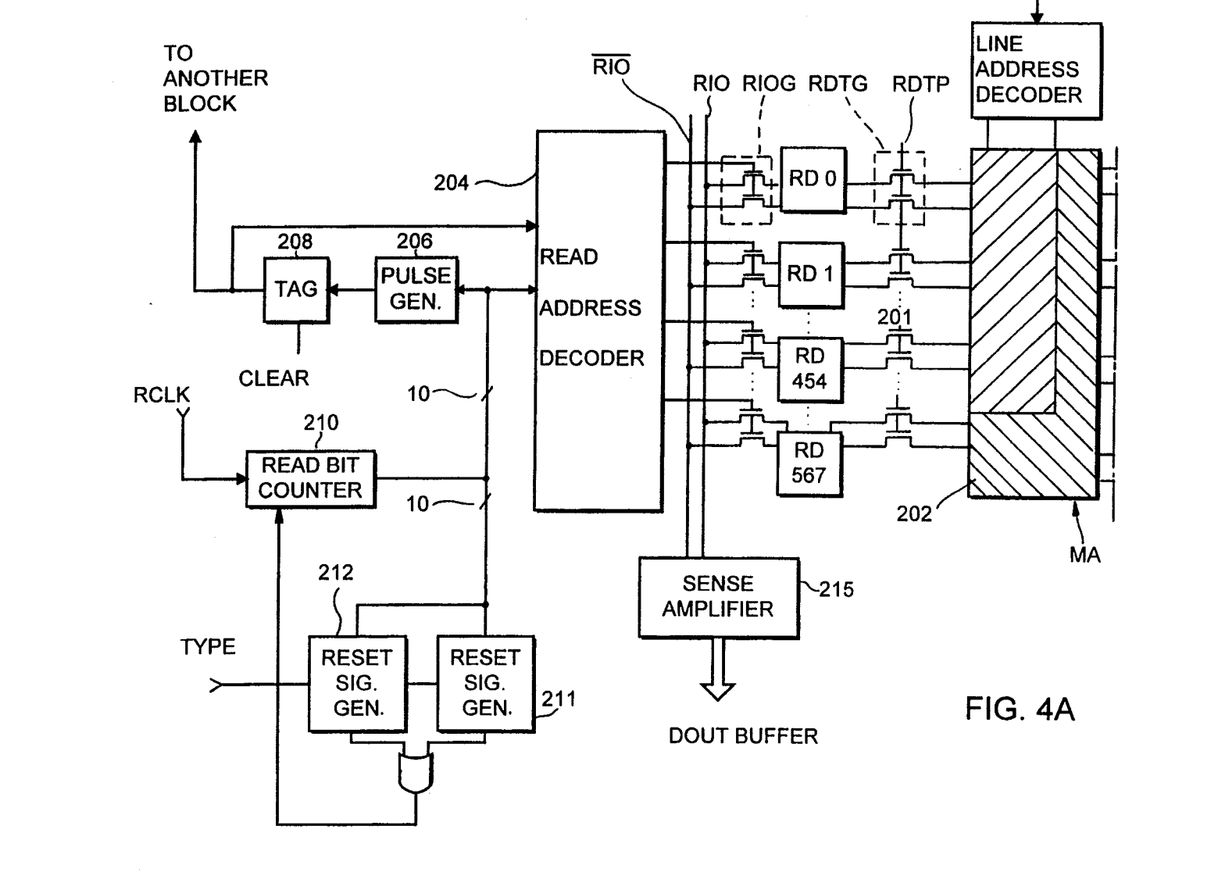
FIGS. 4A and 4B are embodiments of the read and write paths of the video field memory as shown in FIG. 2.
Figure 4B:
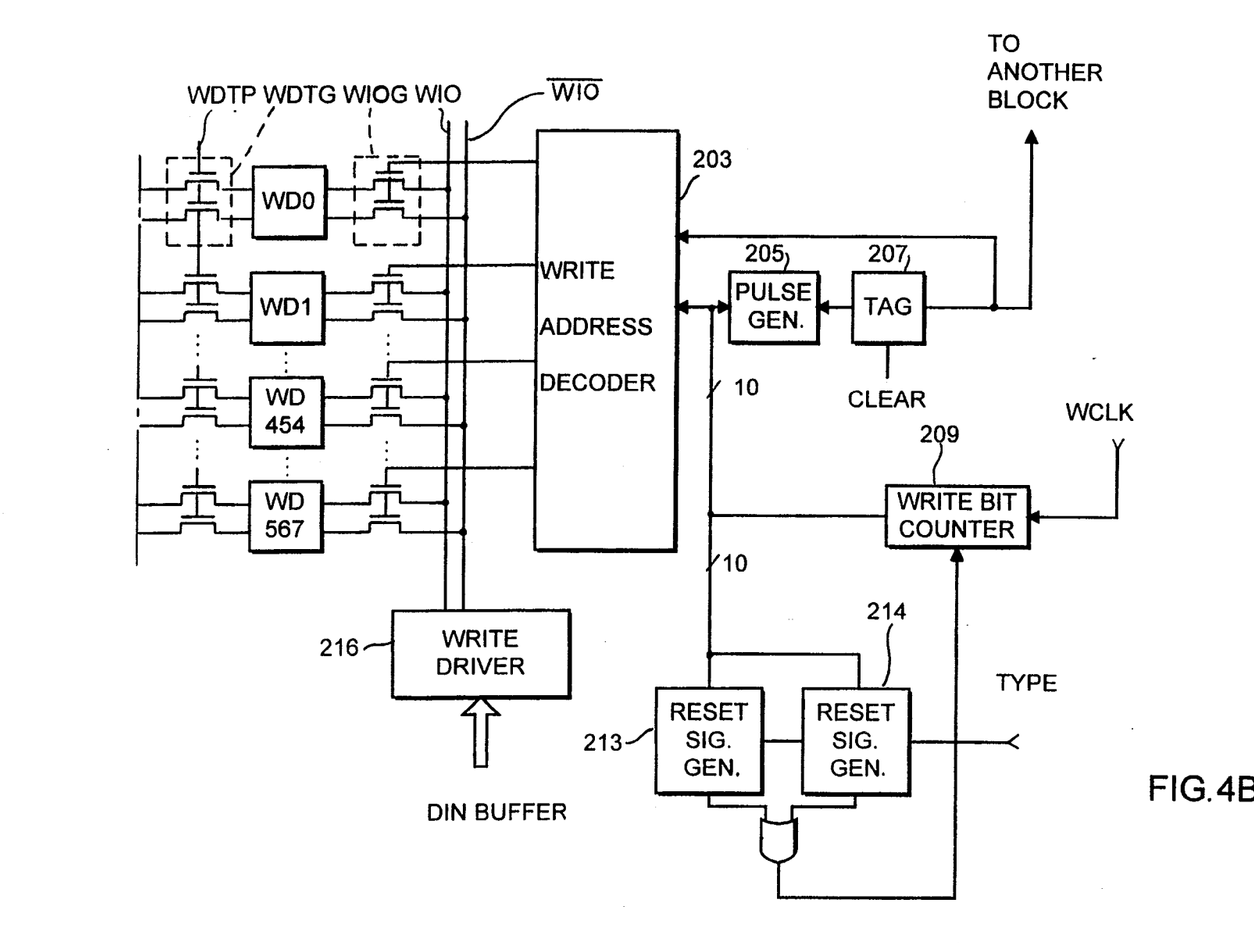

FIG. 4 shows an embodiment of the substantial read and write paths of the video field memory of FIG. 2, in which a memory array MA is composed of two blocks, i.e., a memory cell array 201 for the NTSC system and a memory cell array 202 for the PAL system to be suitable for the multi-broadcasting system. A read data transfer path RDTP signal is used for transferring the data at a line of a RAM (Random Access Memory) of the memory cell array MA to data read registers RD0~RD567 through a read data transmission gate RDTG. Similarly, a write data transfer path WDTP signal is used for transferring the data in write data registers WD0-WD567 to a line of the RAM of the memory cell array MA. Each of the read and write data registers is connected to a pair of bit lines of the RAM.

First, the data in the data read and write registers are transferred to read input and output lines RIO and $\overline{\text{RIO}}$, and write input and output lines WIO and $\overline{\text{WIO}}$ through read input/output gate RIOG and write input output gate WIOG, respectively. The data at the read input and output lines RIO and ROI is amplified by a sense amplifier 215 and provided to the data output buffer DOUT. Also, the output data from the data input buffer DIN is transferred to the write input and output lines WIO and $\overline{\text{WIO}}$ through a write driver 216. Only one of the 568 read input/output gates RIOG is enabled by a read address decoder 204. Similarly, a write address decoder 203 enables only one of the 568 write input/output gates WIOG.

Next, a read bit counter 210 in the input stage of the read address decoder 204 counts up according to a read bit clock RCK signal. Read counting reset signal generators 211 and 212 reset the read bit counter to 0 through an OR-gate. The reset signal of the reset signal generators 211 is generated when the external signal TYPE is low in the NTSC system, while the reset signal of the other reset signal generator 212 is generated when the TYPE signal is high in the PAL system. The TYPE signal generator recognizes when the value of the read bit counter 210 is 568 for the NTSC system and 455 for the PAL system.

Also, when the read bit counter 210 is reset to 0, a pulse generator 206 provides a pulse signal to a read block selection tag 208. Then, the tag 208 generates the read block selection tag signal, being toggled whenever the pulse is provided from the pulse generator, where the tag signal is always reset to 'low' according to a clear signal.

On the other hand, a write bit counter 209 at the input stage of the write address decoder 203 counts up according to a write bit clock signal. Similarly to the read bit counter 210, the write bit counter 209 is reset to 0 by a reset signal from a write counting reset signal generator 213 in the NTSC system and by a reset signal from the other write counting reset signal generator 214 in the PAL system.

The pulse generator 205 provides a pulse to a write block selection tag 207 when the value of the write bit counter is reset to 0, toggling the tag signal. Thus, the 10-bit output signals from the write and read bit counters 209 and 210 become the input signals of the address write and read decoders 203 and 204, respectively.

As described above, the video field memory device for multi-broadcasting system has the upper and lower half memory cell array blocks having the scanning bits of 1023×4 and the scanning lines of 313×4 corresponding to the largest one of various television broadcasting systems, thereby being used for both NTSC and PAL systems.

Thus, the video field memory device according to the present invention can be used for various television systems according to the external broadcasting selection signal TYPE.

The invention is in no way limited to the embodiment described hereinabove. Various modifications of the disclosed embodiment as well as other embodiments of the invention within the scope of the appended claims will now become apparent to those who have a good skill at the art with reference to the description of the invention.

What is claimed is:

1. A video field memory device for a multi-broadcasting system, comprising:
   upper and lower memory cell arrays according to a largest scanning bit and a largest scanning line for multi-broadcasting systems for storing an image memory;
   data write registers for writing a serial input data in parallel, said serial input data being provided through a data input buffer to a data line of said upper and lower memory cell arrays;
   write data pointers for assigning write bit points to said data write registers;
   read data registers for serially reading parallel data provided to either address line of said upper or lower half memory cell array through a data read output buffer;
   read data pointers for assigning read bit points to said read data registers;
   a line address decoder for decoding read address lines and write address lines of said upper and lower half memory cell arrays by a read address pointer, a write address pointer, and a refresh address pointer according to a predetermined sequence; and
   an address input circuit for controlling said respective address pointer.

2. An apparatus for processing signals of a memory cell which is combined with a memory cell array of NTSC system and that of PAL system, comprising:
   a read address transferring path comprising a read address decoder for decoding read address lines according to a read block selection tag pulse and an output pulse from a read bit counter, and 568 read data registers for storing a signal selected by said read address decoder and through read input and output lines to each read address line; and
   a write address transferring path comprising a write address decoder for decoding write address lines according to a write address selection tag pulse and an output pulse from a write bit counter, and 568 write data registers for storing a signal selected by said address write decoder through write input and output lines at each write address line.

3. The apparatus as claimed in claim 2, wherein a sense amplifier is connected to said pair of read input and output lines and a write driver is connected to said pair of write input and output lines.

4. The apparatus as claimed in claim 3, wherein 568 read input and output gates are connected to said read input and output lines and 568 write input and output gates are connected to said write input and output lines.

5. The apparatus as claimed in claim 2, wherein read data transfer gates are connected between said upper and lower memory cell arrays and said data read registers, and write data transfer gates are connected between said upper and lower memory cell arrays and said data write registers.

6. The apparatus as claimed in claim 2, wherein said read and write bit counters generate bit signals according to reset signals of read and write counter reset signal generators, respectively.

7. In a video field memory device having at least one memory cell array for storing an image signal of a TV broadcast system by bits and lines thereof, the improvement for multiple TV broadcasting systems:
   wherein the memory cell array has memory cells for a largest number of bits and lines of image signals of the multiple TV broadcasting systems; and
   further comprising control means for selecting memory cells of the memory cell array according to the number of bits and lines of the image signal of a selected one of the multiple TV broadcasting systems,
   the control means comprising resettable counter means for resetting according to the number of bits and lines of the selected one of the multiple TV broadcasting systems,
   the memory cell array being divided into an NTSC TV broadcasting system block and a larger PAL TV broadcasting system block,
   the counter means comprising means for producing a tag pulse each time the counter means is reset, and the control means selecting one of the NTSC and PAL blocks in response to each tag pulse.

8. The device according to claim 7, wherein the control means comprises logic means responsive to a high logic type signal for setting one of an NTSC and a PAL TV broadcasting system and a low logic type signal for selecting the other thereof.

9. The device according to claim 8, wherein the logic means comprises first and second read counting reset signal generators respectively responsive to the high and low logic type signals and an OR gate for communicating responses of the reset signal generators to the counter means.

10. The device according to claim 9, wherein the tag means comprises a pulse generator for producing a generated pulse in response to each resetting of the counter means, a tag generator for producing the tag pulse in response to the generated pulse, and clear signal means for providing a clear signal that resets the tag generator after each tag pulse.

11. The device according to claim 10, wherein the memory cell array has input and output means for receiving and outputting the image signals of the multiple TV broadcasting systems and the control means are operative on each of the input and output means.

12. The device according to claim 7, wherein the tag means comprises a pulse generator for producing a generated pulse in response to each resetting of the counter means, a tag generator for producing the tag pulse in response to the generated pulse, and clear signal means for providing a clear signal that resets the tag generator after each tag pulse.

* * * * *